United States Patent
Kim

(10) Patent No.: US 9,190,635 B2
(45) Date of Patent: Nov. 17, 2015

(54) RECHARGEABLE BATTERY HAVING A SHORT CIRCUIT PLATE

(75) Inventor: Dukjung Kim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 890 days.

(21) Appl. No.: 13/332,258

(22) Filed: Dec. 20, 2011

(65) Prior Publication Data

US 2013/0029190 A1   Jan. 31, 2013

(30) Foreign Application Priority Data

Jul. 29, 2011   (KR) .................. 10-2011-0075590

(51) Int. Cl.
| | |
|---|---|
| H01M 2/34 | (2006.01) |
| H01M 2/04 | (2006.01) |
| H01M 2/06 | (2006.01) |
| H01M 2/08 | (2006.01) |
| H01M 2/30 | (2006.01) |

(52) U.S. Cl.
CPC ............. *H01M 2/043* (2013.01); *H01M 2/06* (2013.01); *H01M 2/08* (2013.01); *H01M 2/305* (2013.01); *H01M 2/34* (2013.01); *H01M 2/345* (2013.01); *H01M 2220/20* (2013.01)

(58) Field of Classification Search
CPC .......................... H01M 2/345; H01M 2200/20
USPC ..................................... 429/53–61
See application file for complete search history.

(56) References Cited

U.S. PATENT DOCUMENTS

| | | | | |
|---|---|---|---|---|
| 2010/0279156 | A1* | 11/2010 | Kim et al. ................ | 429/56 |
| 2011/0039136 | A1* | 2/2011 | Byun et al. .............. | 429/56 |
| 2012/0202096 | A1 | 8/2012 | Kim | |
| 2012/0214030 | A1* | 8/2012 | Guen ...................... | 429/61 |

FOREIGN PATENT DOCUMENTS

| | | |
|---|---|---|
| EP | 2 284 932 A1 | 2/2011 |
| EP | 2 490 282 A1 | 8/2012 |

(Continued)

OTHER PUBLICATIONS

KIPO Notice of Allowance dated May 22, 2013, for Korean priority Patent application 10-2011-0075590, (5 pages).

(Continued)

*Primary Examiner* — Jonathan G Leong
(74) *Attorney, Agent, or Firm* — Christie, Parker & Hale, LLP

(57) ABSTRACT

A rechargeable battery includes a case, an electrode assembly in the case, a terminal electrically connected to the electrode assembly, and a cap assembly sealing the case. The cap assembly includes a cap plate having a short circuit opening and a short circuit plate in the short circuit opening. The terminal includes a collector plate connected to the electrode assembly, a collector terminal connected to the collector plate and penetrating the cap plate, and a fastening terminal spaced apart from the cap plate. The fastening terminal includes a fastener engaged with the collector terminal, and an extender extending from the fastener. The extender is adjacent to the short circuit plate. The cap assembly also includes an insulation member between the cap plate and the fastening terminal, and a cover covering the extender.

18 Claims, 5 Drawing Sheets

(56) References Cited

FOREIGN PATENT DOCUMENTS

| JP | 2009-252395 | 10/2009 |
| KR | 10-2007-0014633 | 2/2007 |
| KR | 10-2007-0071063 | 7/2007 |
| KR | 10-2011-0005197 A | 1/2011 |
| KR | 10-1175020 | 8/2012 |

OTHER PUBLICATIONS

Patent Abstracts of Japan, and English machine translation of Japanese Publication 2009-252395, dated Oct. 29, 2009, listed above, ( pages).

European Search Report dated Dec. 5, 2012, for corresponding European Patent application 12158478.3, (5 pages).

* cited by examiner

RECHARGEABLE BATTERY HAVING A SHORT CIRCUIT PLATE

CROSS-REFERENCE TO RELATED APPLICATION

This application claims priority to and the benefit of Korean Patent Application No. 10-2011-0075590, filed in the Korean Intellectual Property Office on Jul. 29, 2011, the entire content of which is incorporated herein by reference.

BACKGROUND

1. Field

The present invention relates to a rechargeable battery.

2. Description of Related Art

Unlike a primary battery, which generally may not be recharged, a rechargeable battery may be repeatedly charged and discharged. Lower power batteries are used for various advanced electronic devices such as cellular phones, laptop computers, and camcorders. High power batteries are used as a power source for motors, such as in electric scooters, hybrid electric vehicles, and electric vehicles.

Secondary batteries may be classified into different types, for example, cylindrical and prismatic. A rechargeable battery includes an electrode assembly having positive and negative electrodes and a separator interposed therebetween. The rechargeable battery is constructed by inserting the electrode assembly and electrolyte in a case, and installing a cap assembly on the case. Positive and negative electrode terminals are electrically connected to the electrode assembly and may outwardly protrude and extend through the cap plate.

SUMMARY

Aspects of embodiments of the present invention include a rechargeable battery having reduced weight and a simplified manufacturing process as a result of reducing the number of components while having improved the yield thereof.

In one embodiment of the present invention, a rechargeable battery includes a case; an electrode assembly in the case; a cap assembly sealing the case and including a cap plate having a short circuit opening and a short circuit plate in the short circuit opening. The rechargeable battery also includes a terminal electrically connected to the electrode assembly, the terminal including a collector plate electrically connected to the electrode assembly, a collector terminal electrically connected to the collector plate and extending through the cap plate, and a fastening terminal spaced apart from the cap plate. The fastening terminal includes a fastener engaged with the collector terminal, and an extender extending from the fastener, the extender being adjacent to the short circuit plate. The cap assembly further includes an insulation member between the cap plate and the fastening terminal, and a cover covering the extender.

The cover may have a plane portion and a first sidewall extending from the plane portion to the extender. The first sidewall may be adjacent to the fastener and may have a coupling groove to fix the cover to the fastener.

The insulation member may have a bottom portion and a second sidewall upwardly extending from the bottom portion. The insulation member may also include a first receiving region adjacent to the fastener and a second receiving region adjacent to the extender.

The bottom portion may have a collector terminal opening through which the collector terminal passes, and a first opening adjacent to the short circuit plate. A diameter of the first opening may be equal to or greater than a diameter of the short circuit opening.

The second receiving region may have a plurality of first coupling grooves in the second sidewall, the cover may have a plurality of first coupling protrusions in the first sidewall, and the first coupling protrusions may be engaged with and fixed to the first coupling grooves. The first coupling protrusions may be cylindrical, and the first coupling grooves may be shaped to correspond to the cylindrical shape of the first coupling protrusions.

The second receiving region may have a second coupling grooves in the second sidewall, the cover may have a plurality of second coupling protrusions in the first sidewall, and the second coupling protrusions may be engaged with and fixed to the second coupling grooves. The second coupling protrusions may be rectangular, and the second coupling grooves may be shaped to correspond to the rectangular shape of the second coupling protrusions.

The bottom portion may have a plurality of first protrusions on a surface facing the fastener, the fastener may have a plurality of first rotation prevention grooves on a surface facing the bottom portion, and the first protrusions may be engaged with and fixed to the first rotation prevention grooves.

The bottom portion may have a plurality of second protrusions formed on a surface facing the cap plate, the cap plate may have a plurality of second rotation prevention grooves, and the second protrusions may be engaged with and fixed to the second rotation prevention grooves.

The insulation member may have vertical protrusions at an edge of the second sidewall, the cover may have vertical grooves at an edge of the cover, and the vertical protrusions may be engaged with the vertical grooves to fix the insulation member to the cover.

The cap plate may have a sealing housing groove into which a portion of the second sidewall is inserted.

The fastener may have a terminal penetration opening through which the collector terminal penetrates.

The fastener may have a height greater than that of the extender.

The extender may have a second opening corresponding to the short circuit plate. A diameter of the second opening may be smaller than that of the short circuit opening. The extender may have a support extending from the second opening to the cover.

As described above, in the rechargeable battery according to aspects of embodiments of the present invention, since an electrode terminal and a plate for short circuiting the battery are integrally formed, the number of components is reduced, thereby reducing a weight and simplifying the manufacturing process of the rechargeable battery.

In addition, in the rechargeable battery according to aspects of embodiments of the present invention, because an electrolyte is injected into a case to then be coupled with a cap assembly, the manufacturing process of the rechargeable battery can be simplified.

Additional aspects and/or features of the present invention will be set forth in part in the description which follows and, in part, will be obvious from the description, or may be learned by practice of embodiments of the present invention.

BRIEF DESCRIPTION OF THE DRAWINGS

The features and aspects of embodiments of the present invention will be more apparent from the following detailed description in conjunction with the accompanying drawings, in which.

DETAILED DESCRIPTION

Figure 1:
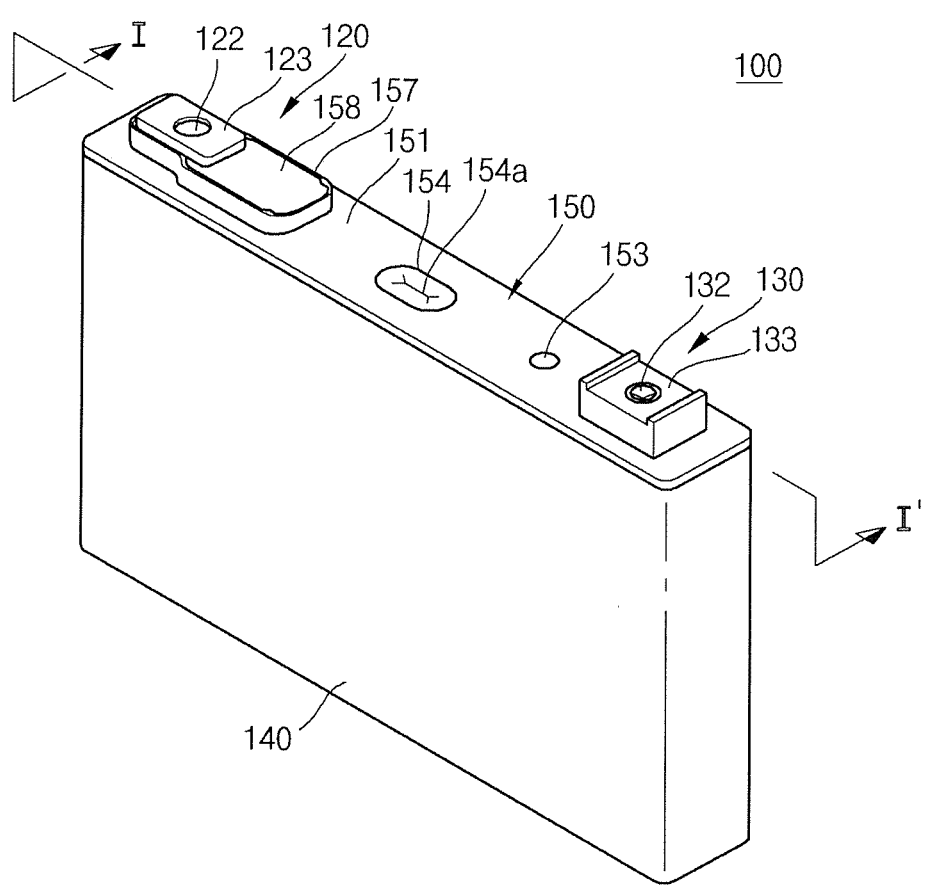
FIG. 1 is a perspective view of a rechargeable battery according to an embodiment of the present invention.

Hereinafter, embodiments of the present invention will be described in detail with reference to the accompanying drawings, wherein like reference numerals refer to like elements throughout.

Figure 2:
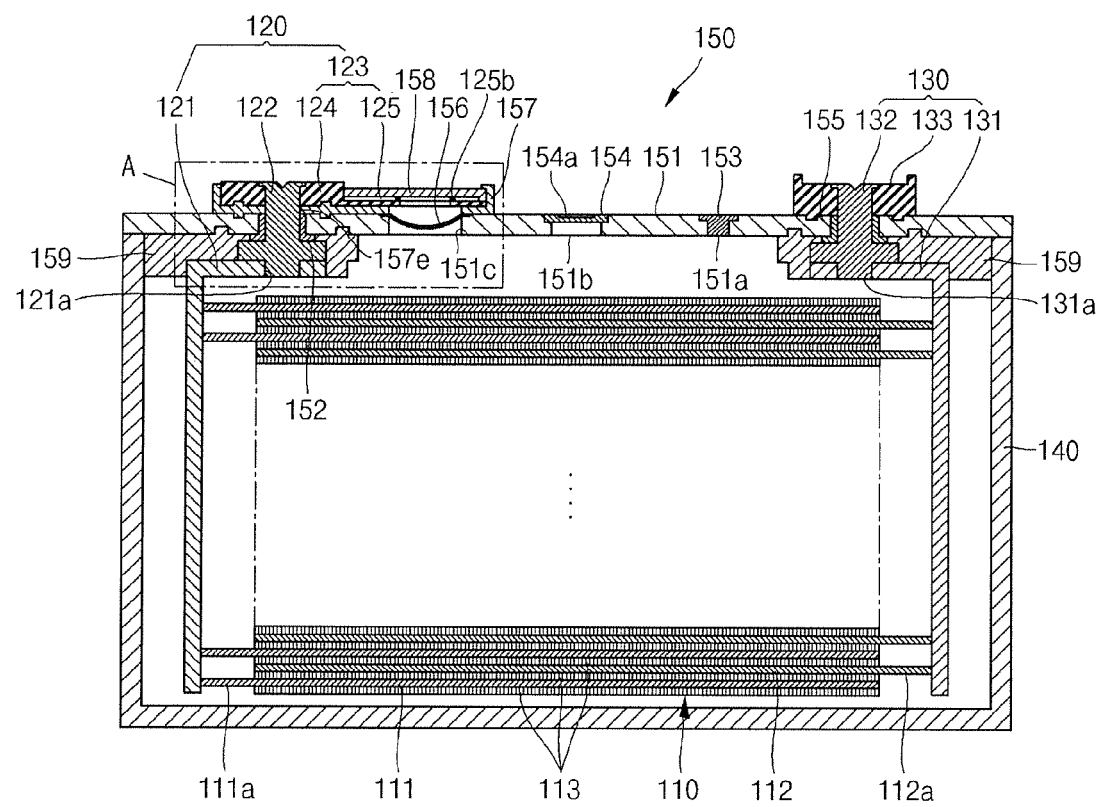
FIG. 2 is a cross-sectional view of the rechargeable battery of FIG. 1, taken along the line I-I'.
Figure 3:
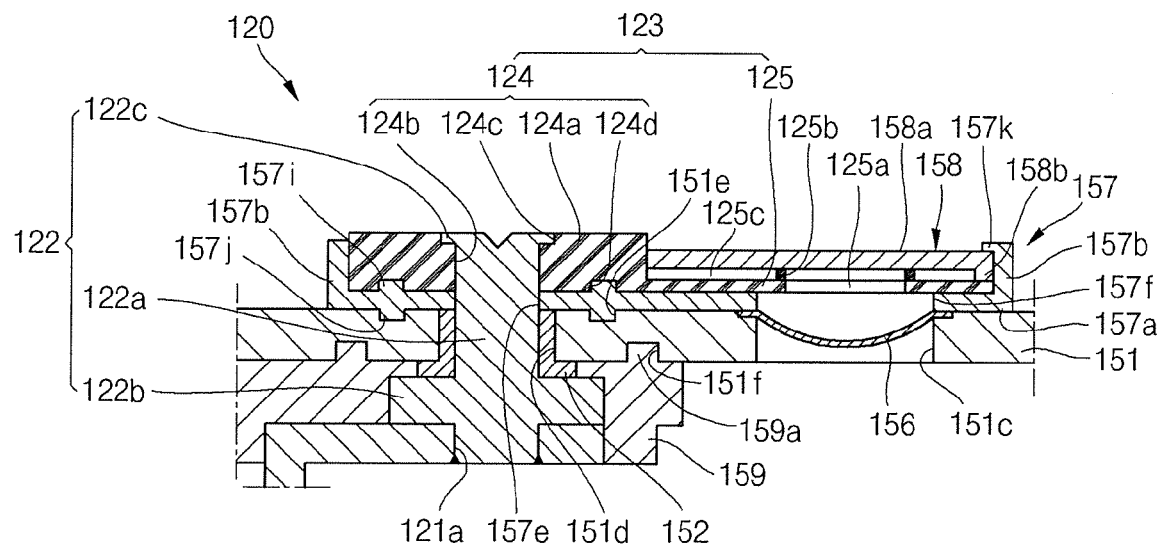
FIG. 3 is an enlarged cross-sectional view of portion 'A' of FIG. 2.
Figure 4:
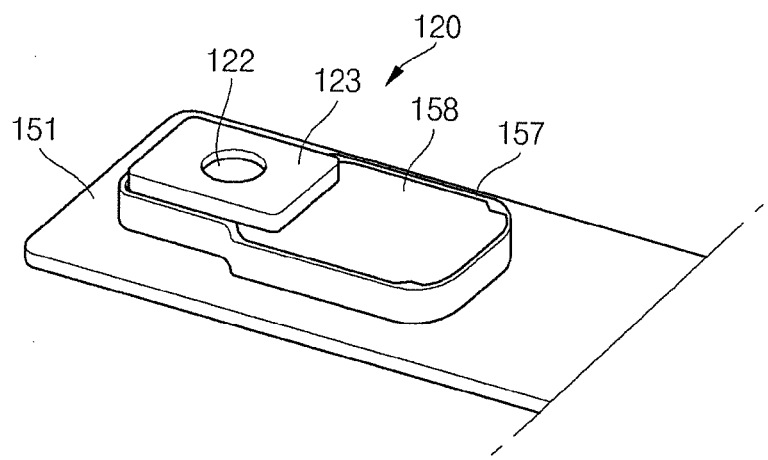
FIG. 4 is a perspective view of a fastening terminal of FIG. 3.
Figure 5:
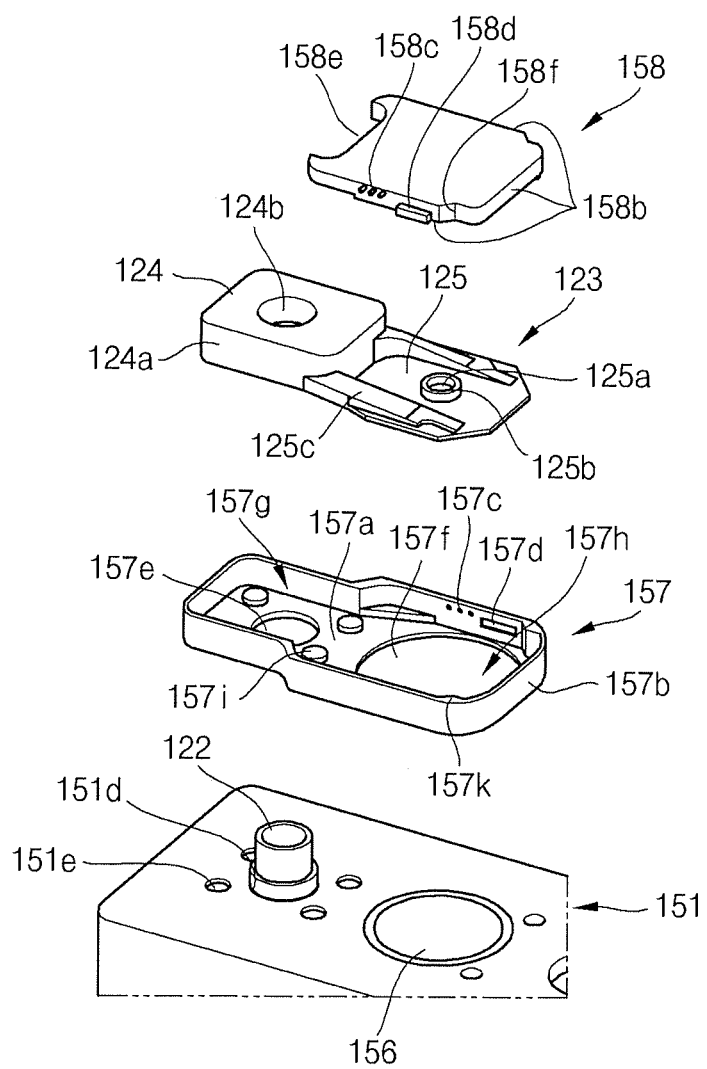
FIG. 5 is an exploded perspective view illustrating how the cap plate and the fastening terminal shown in FIG. 3 are coupled to each other.

FIG. 1 is a perspective view of a rechargeable battery according to an embodiment of the present invention, FIG. 2 is a cross-sectional view of the rechargeable battery of FIG. 1, taken along the line I-I', FIG. 3 is an enlarged cross-sectional view of portion 'A' of FIG. 2, FIG. 4 is a perspective view of the fastening terminal of FIG. 3, and FIG. 5 is a perspective view illustrating the cap plate and the fastening terminal shown in FIG. 3 connected to each other.

Referring to FIGS. 1 to 5, a rechargeable battery 100 according to an embodiment of the present invention includes an electrode assembly 110, a first terminal 120, a second terminal 130, a case 140, and a cap assembly 150.

The electrode assembly 110 may be formed by stacking and winding a first electrode plate 111 (formed as a plate or a film), a second electrode plate 112 (formed as a plate or a film), and a separator 113 located between the first electrode plate 111 and the second electrode plate 112. Here, the first electrode plate 111 may function as a negative electrode, and the second electrode plate 112 may function as a positive electrode, and vice versa.

The first electrode plate 111 is formed by coating a first electrode active material, such as graphite or carbon, on a first electrode current collector formed of a metal foil made of, for example, nickel or copper. In addition, the first electrode plate 111 includes a first electrode uncoated portion 111a that is not coated with a first active material. The first electrode uncoated portion 111a becomes a current flow path between the first electrode plate 111 and the first collector plate 121 via the exterior side of the first electrode plate 111. However, the present invention is not limited to the materials of the first electrode plate 111 described above.

The second electrode plate 112 is formed by coating a second electrode active material, such as a transition metal oxide, on a first electrode current collector formed of a metal foil made of, for example, aluminum. In addition, the second electrode plate 112 includes a second electrode uncoated portion 112a that is not coated with a second active material. The second electrode uncoated portion 112a becomes a current flow path between the second electrode plate 112 and the second collector plate 131 via the exterior side of the second electrode plate 112. However, the present invention is not limited to the materials of the second electrode plate 112 described above.

The first electrode plate 111 and the second electrode plate 112 may be arranged after changing polarities thereof.

The separator 113 is located between the first electrode plate 111 and the second electrode plate 112. The separator 113 prevents a short circuit and allows movement of lithium ions between the electrodes. The separator 113 may be formed of, for example, polyethylene, polypropylene, or a composite film of polyethylene and polypropylene. However, the present invention is not limited to the materials of the separator 113 described above.

The electrode assembly 110 may be placed in the case 140 along with electrolyte (not shown). The electrolyte may include an organic solvent, e.g., ethylene carbonate (EC), propylene carbonate (PC), diethyl carbonate (DEC), ethyl methyl carbonate (EMC), and/or dimethyl carbonate (DMC); and a lithium salt, e.g., $LiPF_6$, and/or $LiBF_4$. The electrolyte may exist in a liquid, solid, or gel phase.

A first terminal 120 is coupled and electrically connected to one of the first electrode plate 111 or the second electrode plate 112, and a second terminal 130 is coupled and electrically connected to the other of the first electrode plate 111 or the second electrode plate 112.

The first terminal 120 is generally formed of a metal or equivalents thereof, and is electrically connected to the first electrode plate 111. The first terminal 120 includes a first collector plate 121, a first collector terminal 122, and a first fastening terminal 123.

The first collector plate 121 contacts the first electrode uncoated portion 111a of the first electrode plate 111, which protrudes to one end of the electrode assembly 110. The first collector plate 121 may be welded to the first electrode uncoated portion 111a. The first collector plate 121 may be formed in a substantially reverse 'L' shape and may have a first terminal opening 121a. The first collector terminal 122 is inserted into the first terminal opening 121a and then coupled thereto. The first collector plate 121 may be formed of, for example, copper, a copper alloy, or equivalents thereof. However, the present invention is not limited to the materials of the first collector plate 121 described above.

The first collector terminal 122 penetrates through the cap plate 151 and upwardly protrudes from the cap plate by a set length. In addition, the first collector terminal 122 is electrically connected to the first collector plate 121 below the cap plate 151. The first collector terminal 122 may be formed of, for example, a copper alloy, and equivalents thereof. However, the present invention is not limited to the material of the first collector terminal 122 described above. In more detail, the first collector terminal 122 includes a first body 122a, a flange 122b and a fixing part 122c (e.g., a lip).

The first body 122a is divided into an upper pillar protruding to and/or through the cap plate 151 and a lower pillar connected to a lower portion of the upper pillar and extending to and/or through a lower portion of the cap plate 151. The first body 122a may have a cylindrical shape, but the present invention is not limited thereto.

The flange 122b horizontally extends from a side of the lower pillar of the first body 122a. The flange 122b prevents the first collector terminal 122 from being dislodged from the cap plate 151. Meanwhile, a part of the lower pillar of the first body 122a connected to the lower portion of the flange 122b is fitted into the first terminal opening 121a of the first collector plate 121 and is then welded.

The fixing part 122c horizontally extends from a side of the upper pillar of the first body 122a. The fixing part 122c allows the first collector terminal 122 to be fixed to the first fastening terminal 123. The fixing part 122c may be formed by riveting an end of the upper pillar of the first collector terminal 122.

The first fastening terminal 123 is spaced apart from a top of the cap plate 151. Specifically, the first fastening terminal 123 is coupled to an upper insulation member 157 on top of the cap plate 151. In addition, the first fastening terminal 123 is coupled to the first collector terminal 122 such that the upper pillar of the first collector terminal 122 penetrates through the first fastening terminal 123. In addition, the first fastening terminal 123 corresponds to a short circuit plate 156 formed in (e.g., on) the cap plate 151. To this end, the first fastening terminal 123 includes a fastener 124 and a first extender 125. In some embodiments, the fastener 124 and the extender 125 are integrally formed. Here, the fastener 124 is formed higher than the extender 125. The first fastening terminal 123 is coupled to the first collector terminal 122 through the fastener 124 and is electrically insulated from the cap plate 151 through the upper insulation member 157. In addition, the first fastening terminal 123 is reversed into an upwardly-convex shape through the extender 125 when an internal pressure of the rechargeable battery 100 exceeds a set pressure, thereby causing a short circuit through the short circuit plate 156. If a short circuit is caused, a large amount of current flows through the rechargeable battery 100, generating heat. In some embodiments, a fuse is formed in the first collector terminal 122 or the second collector terminal 132. When a short circuit generates heat, the fuse is melted to cut off the flow of current, thereby preventing or reducing the risk of explosion of the rechargeable battery 100. The first fastening terminal 123 may be formed of one of copper, a copper alloy, aluminum, an aluminum alloy, or equivalents thereof.

The fastener 124 may be formed in a substantially square pillar shape. The fastener 124 includes a fastening body 124a, a first terminal penetration opening 124b, a fixing groove 124c, and a first rotation prevention groove 124d.

The fastening body 124a contacts the upper insulation member 157, and serves as a base allowing the fastener 124 to be stably mounted on the upper insulation member 157.

The first terminal penetration opening 124b is formed to extend from a top surface to a bottom surface of the fastening body 124a, and provides for a space through which the upper pillar of the first collector terminal 122 passes.

The fixing groove 124c is formed at a top end of the fastening body 124a and has a diameter larger than a diameter of the first terminal penetration opening 124b, providing for a space in which the fixing part 122c extends.

The first rotation prevention groove 124d is formed on a bottom surface of the fastening body 124a and is coupled to a first protrusion 157i formed in the upper insulation member 157. The first rotation prevention groove 124d prevents the first fastening terminal 123 from rotating when the first collector terminal 122 is coupled to the first fastening terminal 123.

The extender 125 horizontally extends from a lower exterior edge of the fastening body 124a so as to cover the short circuit plate 156. The extender 125 includes a second opening 125a located at a region corresponding to the short circuit plate 156, a support 125b extending from the second opening 125a to the cover 158, and opposite sidewalls 125c extending from opposite sides of the extender 125 toward the cover 158. A diameter of the second opening 125a is smaller than a diameter of the short circuit opening 151c formed in the cap plate 151. Thus, the second opening 125a allows the reversed short circuit plate 156 to contact the edge of the second opening 125a. The second opening 125a allows the short circuit plate 156 to contact the extender 125 with an increased contact area, thereby allowing a short circuit between the short circuit plate 156 and the extender 125 to be caused more quickly when the internal pressure of the rechargeable battery 100 exceeds the set pressure. In addition, the support 125b and the opposite sidewalls 125c support the cover 158 when the extender 125 is engaged with the cover 158. The support 125b and the opposite sidewalls 125c are formed to heights so as to contact the bottom surface of the cover 158. However, aspects of the present invention are not limited to the positional relationship of the support 125b and the opposite sidewalls 125c contacting the cover 158. For example, the support 125b and the opposite sidewalls 125c and the cover 158 may be spaced apart from each other.

The aforementioned first fastening terminal 123 includes the fastener 124 and the extender 125 integrally formed, thereby reducing the number of components. That is, there are a reduced number of components compared to a conventional rechargeable battery in which a separate short circuit member is installed between a collector terminal and a fastener so as to come into contact with the short circuit plate 156, when the internal pressure exceeds the set pressure. Accordingly, the first fastening terminal 123 can simplify the manufacturing process of the rechargeable battery 100.

Like the first terminal 120, the second terminal 130 is generally formed of a metal or equivalents thereof, and is electrically connected to the second electrode plate 112. The second terminal 130 includes a second collector plate 131, a second collector terminal 132 and a second fastening terminal 133.

The second collector plate 131 contacts the second electrode uncoated portion 112a protruding to the other end of the electrode assembly 110. The second collector plate 131 is welded to the second electrode uncoated portion 112a. The second collector plate 131 may be formed in a substantially reverse 'L' shape and has a second terminal opening 131a. The second collector terminal 132 is inserted into the second terminal opening 131a and is coupled thereto. The second collector plate 131 may be formed of, for example, aluminum, an aluminum alloy, or equivalents thereof. However, the present invention is not limited to the material of the second collector plate 131 described above.

The second collector terminal 132 penetrates through the cap plate 151 and upwardly protrudes from the cap plate by a set length. In addition, the second collector terminal 132 is electrically connected to the cap plate 151. The second collector terminal 132 may be formed of, for example, aluminum, an aluminum alloy, or equivalents thereof. However, the present invention is not limited to the material of the second collector terminal 132 described above.

Because the first and second collector terminals 122 and 132 are similar to each other and symmetrical (e.g., substantially symmetrical) with respect to the center of the cap plate 151, a detailed description of the second collector terminal 132 will be omitted.

The second fastening terminal 133 is disposed over (e.g., on) the cap plate 151. The second fastening terminal 133 is coupled to the second collector terminal 132 such that the upper pillar of the second collector terminal 132 penetrates through the second fastening terminal 133. The second fastening terminal 133 may be formed in a substantially square pillar shape. The second fastening terminal 133 is electrically and mechanically connected to the second collector terminal 132. The second fastening terminal 133 may be formed of one of copper, a copper alloy, aluminum, an aluminum alloy, or equivalents thereof. However, the present invention is not limited to the material of the second fastening terminal 133 described above.

The first and second fastening terminals 123 and 133 are similar to each other and symmetrical (e.g., substantially symmetrical) with respect to the center of the cap plate 151, except that in the second fastening terminal 133, the extender 125 is not included. As such, a detailed description of the second fastening terminal 133 will be omitted.

The case 140 may be formed of a conductive metal such as aluminum, an aluminum alloy, or nickel plated steel, and may be formed in a substantially cuboid shape. The case 140 may have an opening in which the electrode assembly 110, the first terminal 120, the second terminal 130, the first electrode terminal 20, the second electrode terminal 30, and electrolyte (not shown) may be accommodated. FIG. 2 illustrates a state in which the case 140 and the cap assembly 150 are coupled to each other, and the opening of the case is now shown, however, the opening of the case is located at a periphery of the cap assembly 150. An internal surface of the case 140 may be subjected to insulation treatment so that the case 140 is electrically insulated from the electrode assembly 110, the first terminal 120, the second terminal 130, and the cap assembly 150.

The cap assembly 150 is coupled to the case 140. In detail, the cap assembly 150 includes a cap plate 151, a gasket 152, a plug 153, a safety vent 154, a connection plate 155, a short circuit plate 156, an upper insulation member 157 and a lower insulation member 159.

The cap plate 151 may seal an opening of the case 140 and may be made of a same material as the case 140. The cap plate 151 may have an electrolyte injection hole 151a, a vent opening 151b, a short circuit opening 151c, and a collector terminal opening 151d. In addition, the cap plate 151 may have second rotation prevention grooves 151e formed on its top surface, and a coupling groove 151f formed on its bottom surface. The cap plate 151 may be coupled to the case 140 by laser welding. Here, since the cap plate 151 may have the same polarity as the second electrode plate 112 and the second terminal 130, the cap plate 151 may have the same polarity as the case 140.

The gasket 152 is provided between the first collector terminal 122 and the cap plate 151 using an insulating material and seals a gap between the first collector terminal 122 and the cap plate 151. The gasket 152 prevents external moisture from permeating the rechargeable battery 100 and also prevents electrolyte in the rechargeable battery 100 from leaking to the outside.

The plug 153 seals an electrolyte injection hole 151a of the cap plate 151. The safety vent 154 is installed in a vent opening 151b of the cap plate 151 and has a notch 154a configured to be opened at a set pressure.

The connection plate 155 is formed at a portion of the cap plate 151 through which the second collector terminal 132 penetrates. The connection plate 155 electrically connects the second collector terminal 132 and the cap plate 151 to each other, and prevents external moisture from permeating the rechargeable battery 100, and also prevents electrolyte in the rechargeable battery 100 from leaking to the outside.

The short circuit plate 156 is installed in a short circuit opening 151c of the cap plate 151. The short circuit plate 156 may be a reversible plate having a downwardly-convex portion and a rim portion fixed to the cap plate 151. The short circuit plate 156 is reversed into an upwardly-convex shape and may be brought into contact with the extender 125 of the first fastening terminal 123 when the internal pressure of the rechargeable battery 100 exceeds a set pressure. Here, the short circuit plate 156 has the same polarity as the cap plate 151 (and the first fastening terminal 123 has a polarity opposite the cap plate 151) to cause a short circuit.

The upper insulation member 157 is formed between the first fastening terminal 123 and the cap plate 151 and accommodates the first fastening terminal 123. To this end, the upper insulation member 157 has a bottom portion 157a, a second sidewall 157b, a first receiving region 157g, and a second receiving region 157h formed by the bottom portion 157a and the second sidewall 157b. In addition, the upper insulation member 157 includes a collector terminal opening 157e, a first opening 157f, first protrusions 157i, and second protrusions 157j.

The bottom portion 157a contacts the cap plate 151 and serves as a base allowing the upper insulation member 157 to be stably mounted on the cap plate 151.

The second sidewall 157b extends upwardly (that is, toward the first fastening terminal) from a side end of the bottom portion 157a, and substantially provides a space in the upper insulation member 157 to receive the first fastening terminal 123. A plurality of first coupling grooves 157c and a plurality of second coupling grooves 157d are formed on the inner wall of the second sidewall 157b. A plurality of first coupling protrusions 158c and a plurality of second coupling protrusions 158d formed on the first sidewall 158b of the cover 158 are engaged with and fixed to the first coupling grooves 157c and the second coupling grooves 157d. Here, the first coupling grooves 157c and the second coupling grooves 157d have shapes corresponding to those of the first coupling protrusions 158c and the second coupling protrusions 158d. For example, if the first coupling protrusions 158c have cylindrical shapes, the first coupling grooves 157c may also have the shapes corresponding to the cylindrical shapes. If a cross section of the second coupling protrusions 158d have a rectangular shape, a cross section of the second coupling grooves 157d may have the shape corresponding to the rectangular shape. The first and second coupling grooves 157c and 157d and the first and second coupling protrusions 158c and 158d could be formed on both opposite sides of the first and second sidewalls 158b and 157b.

In addition, at least one vertical protrusion 157k protruding inwardly is formed at an edge portion of the second sidewall 157b. The vertical protrusion 157k fixes the lateral surface of the cover 158.

The first receiving region 157g and the second receiving region 157h are formed by the bottom portion 157a and the second sidewall 157b to receive the fastener 124 and the extender 125 of the first fastening terminal 123. Here, the first receiving region 157g and the second receiving region 157h may have shapes corresponding to those of the fastener 124 and the extender 125 to receive the fastener 124 and the extender 125 of the first fastening terminal 123.

The collector terminal opening 157e is formed to allow the first collector terminal 122 to pass through the bottom portion 157a in the first receiving region 157g.

The first opening 157f is formed in the bottom portion 157a of the second receiving region 157h to correspond to the short circuit plate 156. The first opening 157f has a diameter larger than that of the short circuit opening 151c of the cap plate 151, thereby facilitating contact between the short circuit plate 156 and the extender 125 of the first fastening terminal 123.

The first protrusion 157i is formed on a top surface of the bottom portion 157a in the vicinity of the collector terminal opening 157e, and is engaged with the first rotation prevention groove 124d formed on the bottom surface of the fastening body 124a.

The second protrusions 157j are formed on the bottom surface of the bottom portion 157a in the vicinity of the collector terminal opening 157e and are engaged with the second rotation prevention grooves 151e formed on the top surface of the cap plate 151.

The cover 158 is detachably coupled to the insulation member 157 so as to cover the extender 125 of the first fastening terminal 123. The cover 158 has a plane portion 158a and a first sidewall 158b.

The plane portion 158a is formed above the extender 125 to cover the extender 125 of the first fastening terminal 123.

The first sidewall 158b extends downwardly (that is, toward the extender 125) from one end of the plane portion 158a. The first sidewall 158b has a coupling recess 158e formed in vicinity of the fastener 124. Here, the coupling recess 158e of the first sidewall 158b is fitted into one side of the fastener 124 to then be fixed. In addition, a vertical groove 158f is formed at an edge of the cover 158. The vertical groove 158f has a shape corresponding to that of the vertical protrusion 157k formed at the edge of the second sidewall 157b of the insulation member 157 so as to allow the vertical protrusion 157k to be fitted and fixed thereto. Therefore, according to an embodiment of the present invention, the cover 158 may be more strongly fixed between the fastener 124 and the insulation member 157 because the coupling recess 158e is formed in the vicinity of the fastener 124 and the vertical protrusion 157k is formed opposite to the coupling recess 158e. In addition, the first coupling protrusions 158c of the first sidewall 158b are engaged with the first coupling grooves 157c formed on the second sidewall 157b of the upper insulation member 157 to then be fixed. Here, the first coupling protrusions 158c are cylindrical and protrude horizontally to the exterior. In addition, the second coupling protrusions 158d of the first sidewall 158b is engaged with and fixed to the second coupling grooves 157d formed on the second sidewall 157b of the upper insulation member 157. Here, the second coupling protrusions 158d are rectangular and protrude horizontally to the exterior. Therefore, according to embodiments of the present invention, the first and second coupling protrusions 158c and 158d, which are formed on the first sidewall 158b of the cover 158, are coupled to the first and second coupling grooves 157c and 157d, which are shaped to correspond thereto. A coupling force between the cover 158 and the upper insulation member 157 can therefore be increased. Meanwhile, the first and second coupling protrusions 158c and 158d are coupled to the first and second coupling grooves 157c and 157d, thereby increasing the coupling force therebetween and detachably coupling when necessary.

The lower insulation member 159 is formed between each of the first collector plate 121 and the second collector plate 131 and the cap plate 151 and prevents unnecessary electric shorts therebetween. That is to say, the lower insulation member 159 prevents electric shorts between the first collector plate 121 and the cap plate 151 and between the second collector plate 131 and the cap plate 151. In addition, the lower insulation member 159 is formed between each of the first collector terminal 122 and the second collector terminal 132 and the cap plate 151 and prevents unnecessary electric shorts therebetween. The lower insulation member 159 has a coupling protrusion 159a formed on its top surface to be engaged with the coupling groove 151f of the cap plate 151.

As described above, the rechargeable battery 100 according to the embodiment of the present invention includes the first fastening terminal 123 including the fastener 124 and the extender 125 integrally formed, and therefore, it is not necessary to separately provide a component to be brought into contact with the short circuit plate 156 when the internal pressure of the rechargeable battery 100 exceeds a set pressure. Therefore, in a rechargeable battery 100 according to embodiments of the present invention, the number of components can be reduced, thereby reducing manufacturing cost, simplifying the manufacturing process, and improving the yield.

Figure 6:
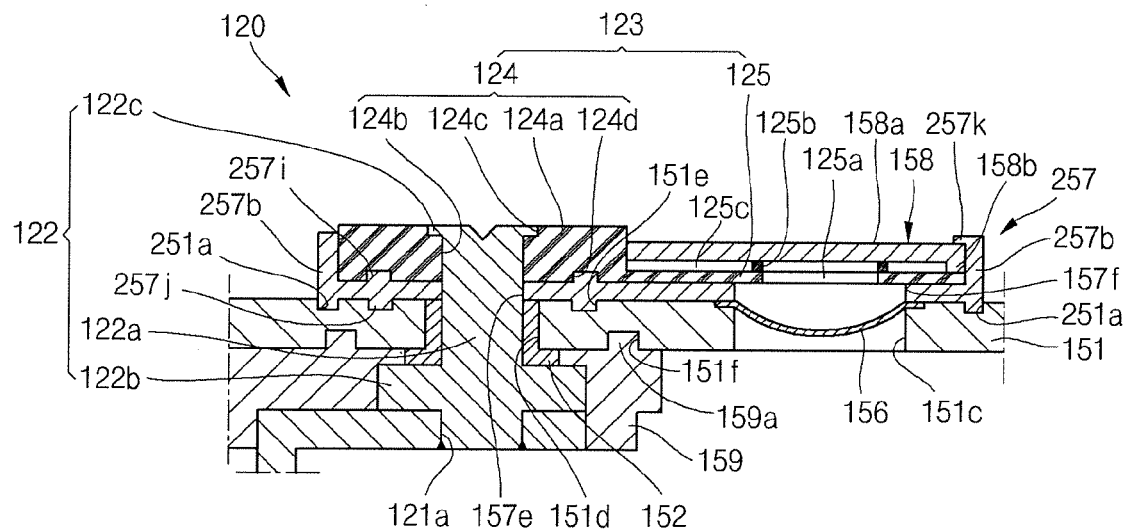
FIG. 6 is a cross-sectional view of a terminal of a rechargeable battery according to another embodiment of the present invention.
Figure 7:
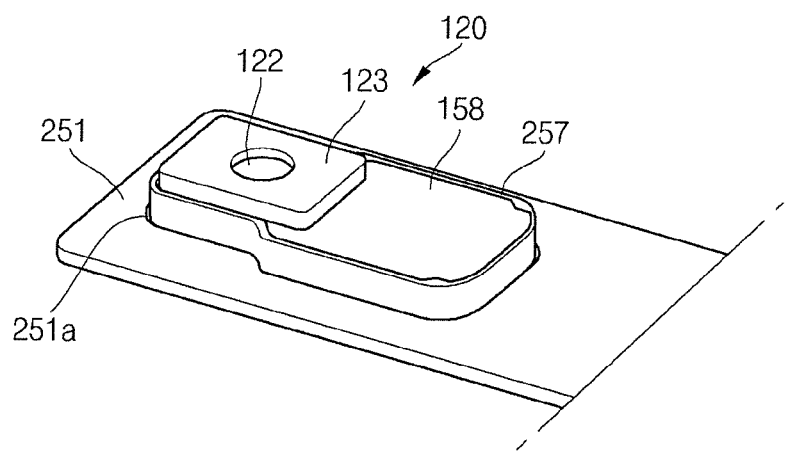
FIG. 7 is a perspective view of the fastening terminal of FIG. 6.

FIG. 6 is a cross-sectional view of a part corresponding to FIG. 3 in a rechargeable battery according to another embodiment of the present invention, and FIG. 7 is a perspective view of the fastening terminal of FIG. 6.

The rechargeable battery according to another embodiment of the present invention is substantially the same as the rechargeable battery 100 shown in FIG. 2, except for the cap plate 251 and the upper insulation member 257. Accordingly, illustration and repeated descriptions of the same component will be omitted, and the following description will focus on the cap plate 251 and the upper insulation member 257.

The cap plate 251 is substantially the same as the cap plate 151 shown in FIG. 2, except that a sealing housing groove 251a, into which part of a second sidewall 257b of the upper insulation member 257 is inserted, is formed on a top surface of the cap plate 251. The sealing housing groove 251a may increase the physical coupling force between the cap plate 251 and the upper insulation member 257, and may enhance sealing efficiency between the cap plate 251 and the upper insulation member 257. Accordingly, it is possible to prevent or reduce the risk of an electric short between the short circuit plate 156 and a extender 125 due to permeation of external moisture into a coupled portion between the cap plate 251 and the upper insulation member 257, thereby also preventing or reducing the risk of corrosion of internal components due to external moisture.

The upper insulation member 257 is substantially the same as the upper insulation member 157 shown in FIG. 2, except that the second sidewall 257b of the upper insulation member 257 extends further downwardly from the bottom portion 257a. Thereby, the portion of the second sidewall 257b extending downwardly from the bottom portion 257a is allowed to be housed in the sealing housing groove 251a of the cap plate 251.

As described above, the rechargeable battery according to embodiments of the present invention including the upper insulation member 257 including the cap plate 251 having the sealing housing groove 251a and the second sidewall 257b, has enhanced sealing efficiency for sealing a space between the cap plate 251 and the upper insulation member 257.

Therefore, the rechargeable battery according to the embodiment of the present invention can prevent an electric short between the a short circuit plate 156 and a extender 125 due to permeation of external moisture into a coupled portion between the cap plate 251 and the upper insulation member 257, and corrosion of internal components due to external moisture can be prevented.

Although exemplary embodiments of the present invention have been described for illustrative purposes, those skilled in the art will appreciate that various modifications, additions and substitutions are possible, without departing from the scope and spirit of the invention as disclosed in the accompanying claims, and equivalents thereof.

What is claimed is:
1. A rechargeable battery, comprising:
a case;
an electrode assembly in the case;
a cap assembly sealing the case and comprising a cap plate having a short circuit opening, and a short circuit plate in the short circuit opening; and
a terminal electrically connected to the electrode assembly comprising:
a collector plate electrically connected to the electrode assembly,
a collector terminal electrically connected to the collector plate and extending through the cap plate, and a fastening terminal spaced apart from the cap plate and comprising a fastener, the fastener being engaged with the collector terminal, and an extender extending from the fastener, the extender being adjacent to the short circuit plate, the cap assembly further comprising an insulation member between the cap plate and the fastening terminal, the insulation member comprising a bottom portion, a first sidewall extending upward from the bottom portion, and a plurality of first coupling grooves in the first sidewall, and a cover covering the extender and being detachably coupled to the insulation member, the cover comprising a plane portion, a second sidewall extending downward from the plane portion, and a plurality of first coupling protrusions at the second sidewall engaged with the plurality of first coupling grooves.

2. The rechargeable battery of claim 1 wherein the second sidewall is adjacent to the fastener and has a recess to fix the cover to the fastener.

3. The rechargeable battery of claim 1, wherein the insulation member includes a first receiving region adjacent to the fastener and a second receiving region adjacent to the extender.

4. The rechargeable battery of claim 3, wherein the bottom portion has a collector terminal opening through which the collector terminal passes, and a first opening adjacent to the short circuit plate.

5. The rechargeable battery of claim 4, wherein a diameter of the first opening is equal to or greater than a diameter of the short circuit opening.

6. The rechargeable battery of claim 3, wherein the plurality of first coupling grooves in the first sidewall of the insulation member is at the second receiving region.

7. The rechargeable battery of claim 1, wherein each first coupling protrusion of the plurality of first coupling protrusions at the second sidewall of the cover is cylindrical, and each first coupling groove of the plurality of first coupling grooves in the first sidewall of the insulation member is shaped to correspond to the cylindrical shape of the plurality of first coupling protrusions.

8. The rechargeable battery of claim 3, wherein the second receiving region has a plurality of second coupling grooves in the first sidewall, the cover has a plurality of second coupling protrusions at the second sidewall, and the plurality of second coupling protrusions are engageable with the plurality of second coupling grooves.

9. The rechargeable battery of claim 8, wherein each second coupling protrusion of the plurality of second coupling protrusions is rectangular, and each second coupling groove of the plurality of second coupling grooves is shaped to correspond to the rectangular shape of the plurality of second coupling protrusions.

10. The rechargeable battery of claim 1, wherein the bottom portion has a plurality of first protrusions on a surface facing the fastener, the fastener has a plurality of first rotation prevention grooves on a surface facing the bottom portion, and the first protrusions are engaged with and fixed to the first rotation prevention grooves.

11. The rechargeable battery of claim 1, wherein the bottom portion has a plurality of second protrusions formed on a surface facing the cap plate, the cap plate has a plurality of second rotation prevention grooves, and the second protrusions are engaged with and fixed to the second rotation prevention grooves.

12. A rechargeable battery, comprising:
a case;
an electrode assembly in the case;
a cap assembly sealing the case and comprising a cap plate having a short circuit opening, and a short circuit plate in the short circuit opening; and
a terminal electrically connected to the electrode assembly comprising:
  a collector plate electrically connected to the electrode assembly,
  a collector terminal electrically connected to the collector plate and extending through the cap plate, and
  a fastening terminal spaced apart from the cap plate and comprising a fastener, the fastener being engaged with the collector terminal, and an extender extending from the fastener, the extender being adjacent to the short circuit plate,
the cap assembly further comprising:
  an insulation member between the cap plate and the fastening terminal, the insulation member comprising a bottom portion, a first sidewall extending upward from the bottom portion, and vertical protrusions at edges of the first sidewall, and
  a cover covering the extender and being detachably coupled to the insulation member, the cover comprising a plane portion, a second sidewall extending downward from the plane portion to the extender, and vertical grooves at edges of the cover, wherein
the vertical protrusions are engaged with the vertical grooves to fix the insulation member to the cover.

13. The rechargeable battery of claim 1, wherein the cap plate has a sealing housing groove into which a portion of the first sidewall is inserted.

14. The rechargeable battery of claim 1, wherein the fastener has a terminal penetration opening through which the collector terminal penetrates.

15. The rechargeable battery of claim 1, wherein the fastener has a height greater than that of the extender.

16. The rechargeable battery of claim 1, wherein the extender has a second opening corresponding to the short circuit plate.

17. The rechargeable battery of claim 16, wherein a diameter of the second opening is smaller than that of the short circuit opening.

18. A rechargeable battery, comprising:
a case;
an electrode assembly in the case;
a cap assembly sealing the case and comprising a cap plate having a short circuit opening, and a short circuit plate in the short circuit opening; and
a terminal electrically connected to the electrode assembly comprising:
  a collector plate electrically connected to the electrode assembly,
  a collector terminal electrically connected to the collector plate and extending through the cap plate, and
  a fastening terminal spaced apart from the cap plate and comprising a fastener, the fastener being engaged with the collector terminal, and an extender extending from the fastener, the extender being adjacent to the short circuit plate,
the cap assembly further comprising an insulation member between the cap plate and the fastening terminal, and a cover covering the extender, wherein the extender has a second opening corresponding to the short circuit plate and a support extending from the second opening to the cover.

* * * * *